US012253816B2

(12) United States Patent
Kanou et al.

(10) Patent No.: US 12,253,816 B2
(45) Date of Patent: Mar. 18, 2025

(54) IMAGE FORMING APPARATUS

(71) Applicant: Konica Minolta, Inc., Tokyo (JP)

(72) Inventors: Hirotaka Kanou, Toyokawa (JP); Hiroyuki Maeda, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/404,474

(22) Filed: Jan. 4, 2024

(65) Prior Publication Data

US 2024/0255877 A1 Aug. 1, 2024

(30) Foreign Application Priority Data

Jan. 26, 2023 (JP) ................................ 2023-010332

(51) Int. Cl.
*G03G 15/00* (2006.01)
*G03G 15/20* (2006.01)

(52) U.S. Cl.
CPC ..... *G03G 15/5008* (2013.01); *G03G 15/2053* (2013.01); *G03G 2215/2045* (2013.01)

(58) Field of Classification Search
CPC ........... G03G 15/5008; G03G 15/2053; G03G 2215/2045; G03G 15/20
See application file for complete search history.

(56) References Cited

U.S. PATENT DOCUMENTS

2015/0139675 A1* 5/2015 Maruyoshi ......... G03G 15/2028 399/68
2016/0274507 A1* 9/2016 Kurita ................ G03G 15/5062
2019/0086843 A1* 3/2019 Sato ................... G03G 15/5029

FOREIGN PATENT DOCUMENTS

JP 2006-309188 A 11/2006
JP 2017-37097 A 2/2017
JP 2019-53242 A 4/2019
JP 2019-159184 A 9/2019
JP 2020-46689 A 3/2020

* cited by examiner

*Primary Examiner* — Sandra Brase
(74) *Attorney, Agent, or Firm* — RANKIN, HILL & CLARK LLP

(57) ABSTRACT

An image forming apparatus includes: a fixing roller that fixes an unfixed image to a medium; a drive motor of the fixing roller, and a hardware processor that acquires information regarding a state of the image forming apparatus or information regarding a state of the medium, and controls a number of rotations of the drive motor between a preset upper limit value and a preset lower limit value, wherein the hardware processor changes the upper limit value and the lower limit value while maintaining a difference between the upper limit value and the lower limit value on a basis of the acquired information.

11 Claims, 11 Drawing Sheets

FIG. 4
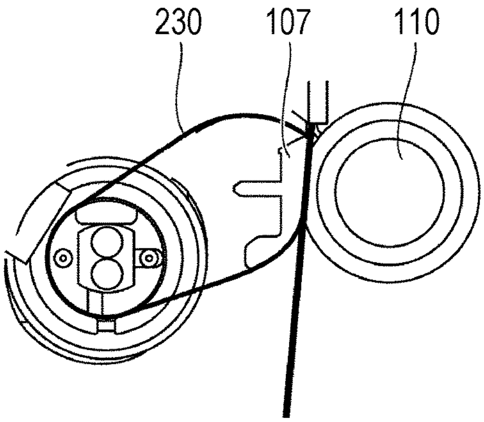
400
| | | INITIAL VARIATION FACTOR | DETERIORATION FACTOR |
|---|---|---|---|
| FIXING ROLLER | OUTSIDE DIAMETER | ○ | ○ |
| | HARDNESS | ○ | ○ |
| NIP WIDTH | LOAD | ○ | — |
| SLIDING RESISTANCE | SLIDING SHEET | ○ | ○ |
| | GREASE | ○ | ○ |
| | FRICTION POWDER | ○ | ○ |
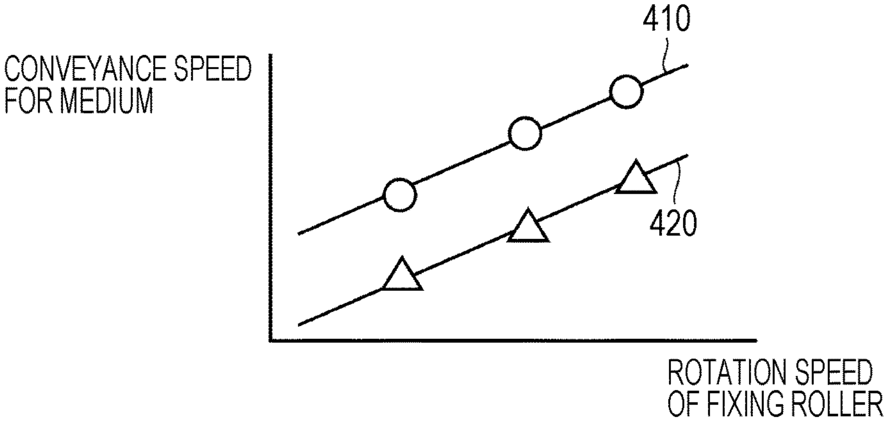

HIGH SPEED RATIO (H RATIO) = $\frac{\text{TIME WHEN SIGNAL OF DRIVE MOTOR IS HIGH}}{\text{LOOP CONTROL TIME}}$

FIG. 11

| INPUT INFORMATION | | UNIT |
|---|---|---|
| MEDIUM CONVEYANCE TIME | S1 | ms |

| ITEM | MEASUREMENT |
|---|---|
| MEDIUM REAR END PASSING TIME: S1<br>S = A−B−C | CALCULATED VALUE |
| MEDIUM REAR END PS1 — SHEET DISCHARGE PS3 ARRIVAL TIME: A | ACTUALLY MEASURED VALUE |
| MEDIUM REAR END SECONDARY TRANSFER R PASSING TIME: B | CALCULATED VALUE |
| MEDIUM REAR END FIXING — SHEET DISCHARGE PASSING TIME: C<br>* CONSIDER FIXING MOTOR CORRECTION VALUE | CALCULATED VALUE |

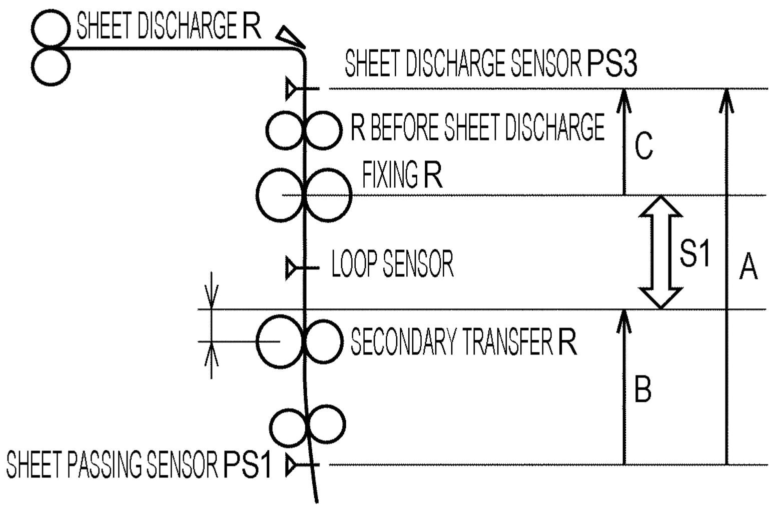

IMAGE FORMING APPARATUS

The entire disclosure of Japanese patent Application No. 2023-010332, filed on Jan. 26, 2023, is incorporated herein by reference in its entirety.

BACKGROUND

Technological Field

The present disclosure relates to an image forming apparatus, and more specifically, to control of a drive motor for a fixing roller.

Description of the Related Art

An image forming apparatus using toner includes a fixing roller. The fixing roller heats a medium to which the toner has been transferred to fix an image on the medium. The fixing roller is rotated while nipping the medium to convey the medium to a sheet discharge roller. The conveyance speed for the medium changes depending on an individual difference at the time of manufacturing the fixing roller or due to deterioration. Conventionally, in a case where the conveyance speed for the medium is too fast or too slow, an engineer needs to manually adjust the rotation speed of the fixing roller. In a case where the fixing roller deteriorates to such an extent that it cannot be adjusted, the engineer replaces the fixing roller (fixer) with a new one.

In recent years, energy saving of image forming apparatuses has been promoted. As a result, a silicone sponge is sometimes used as a member for the fixing roller. The silicone sponge has high thermal conductivity, but has low hardness and a short life. Therefore, the fixing roller including the silicone sponge as a member is more likely to deteriorate than a conventional fixing roller. Therefore, the fixing roller including the silicone sponge as a member requires adjustment of the rotation speed more frequently.

Regarding the control of the rotation speed of a fixing motor, for example, JP 2006-309188 A discloses an image forming apparatus "including a transfer roller pair that transfers an unfixed image to a recording material, a fixing roller pair that fixes the transferred unfixed image to the recording material at a conveyance speed switchable, a plurality of loop detection sensors that detect loops of different sizes of the recording material, and a control substrate that selects a sensor from the sensors according to information related to the recording material and switches the conveyance speed of the fixing roller pair on the basis of a detection signal of the sensor to perform control to maintain the loop of the recording material within a certain range, in which the control substrate selects a loop detection sensor for forming a small loop before a rear end of the recording material passes through the transfer roller pair and performs control to prevent the rear end of the recording material from curling when the rear end passes through the transfer roller pair" (refer to [Abstract]).

In addition, other techniques related to the control of the rotation speed of the fixing motor are disclosed in, for example, JP 2017-037097 A, JP 2020-046689 A, JP 2019-053242 A, and JP 2019-159184 A.

According to the techniques disclosed in JP 2006-309188 A, JP 2017-037097 A, JP 2020-046689 A, JP 2019-053242 A, and JP 2019-159184 A, the number of rotations of the drive motor of the fixing roller cannot be adjusted on the basis of the individual difference or the deterioration state of the fixing roller. Therefore, there is a need for a technique for adjusting the number of rotations of the drive motor of the fixing roller on the basis of the individual difference or the deterioration state of the fixing roller.

SUMMARY

The present disclosure has been made in view of the above-described background, and an object in one aspect is to provide a technique for adjusting the number of rotations of a drive motor of a fixing roller on the basis of an individual difference or a deterioration state of the fixing roller.

To achieve the abovementioned object, according to an aspect of the present invention, an image forming apparatus reflecting one aspect of the present invention comprises: a fixing roller that fixes an unfixed image to a medium; a drive motor of the fixing roller; and a hardware processor that acquires information regarding a state of the image forming apparatus or information regarding a state of the medium, and controls a number of rotations of the drive motor between a preset upper limit value and a preset lower limit value, wherein the hardware processor changes the upper limit value and the lower limit value while maintaining a difference between the upper limit value and the lower limit value on a basis of the acquired information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is a diagram illustrating examples of factors that affect the conveyance speed for a medium:

FIG. 11 is a diagram illustrating sensors included in the image forming apparatus according to the present embodiment and examples of actual measurement values for periods for the medium to arrive at respective passing points.

DETAILED DESCRIPTION OF EMBODIMENTS

Hereinafter, one or more embodiments of the present invention will be described with reference to the drawings. However, the scope of the invention is not limited to the disclosed embodiments. In the following description, identical parts are labeled with the same reference signs. Names and functions of these parts are the same. Therefore, detailed description thereof will not be repeated.

A. Application Example

Figure 1:
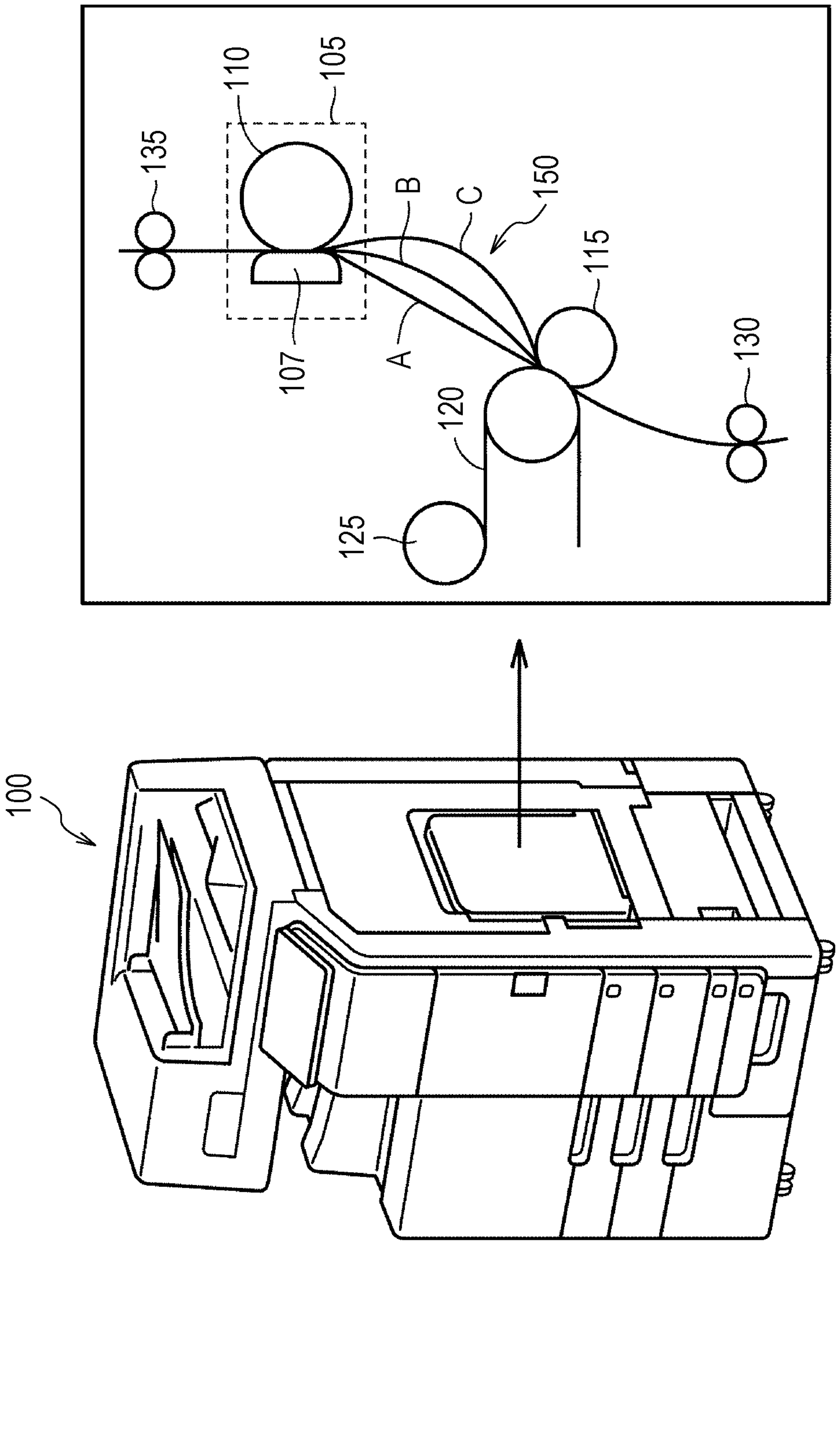
FIG. 1 is a diagram illustrating an example of an image forming apparatus to which the technology of the present disclosure can be applied.

FIG. 1 is a diagram illustrating an example of an image forming apparatus 100 to which the technology of the present disclosure can be applied. With reference to FIG. 1, a configuration of a transferer and a fixer for toner in the image forming apparatus 100 will be described. In addition, problems occurring in the vicinity of the transferer and the fixer for toner will be described. Further, main terms used herein will be described.

a. Configuration of Image Forming Apparatus 100

The image forming apparatus 100 has the following configuration in order to perform toner transfer processing and fixing processing. The image forming apparatus 100 includes a timing roller 130, a secondary transfer roller 115, an intermediate transfer belt 120, a photoreceptor 125, a fixer 105, and a sheet discharge roller 135. The fixer 105 includes a fixing roller 110 and a pad 107. In addition to these components, the image forming apparatus 100 may include components such as an image former, a sheet feeder, and a controller. The image forming apparatus 100 prints an image on a medium 150 using these components. According to an embodiment, at least a part of the fixing roller 110 is a silicone sponge.

The timing roller 130 conveys the medium toward the secondary transfer roller 115. The timing roller 130 also synchronizes the time of transferring a toner latent image to the medium with the time of conveying the medium. To do so, the timing roller 130 adjusts the conveyance speed for the medium and temporarily stops the conveyance of the medium.

The photoreceptor 125 forms the toner latent image on the surface thereof. The toner latent image on the surface of the photoreceptor 125 is transferred to the intermediate transfer belt 120. The image forming apparatus 100 includes a photoreceptor 125 corresponding to each color of toner. As an example, the image forming apparatus 100 includes photoreceptors 125 for yellow (Y), magenta (M), cyan (C), and black (K).

The intermediate transfer belt 120 conveys the toner latent image transferred from the photoreceptor 125 to the secondary transfer roller 115. The toner latent images of the respective photoreceptors 125 are superposed on the intermediate transfer belt 120 to form a full color image.

The secondary transfer roller 115 transfers the toner latent image on the intermediate transfer belt 120 to the medium 150. The secondary transfer roller 115 conveys the medium 150 toward the fixer 105.

The fixer 105 heats the medium 150. The toner latent image on the medium 150 is heated to be fixed to the medium 150. The fixer 105 conveys the medium 150 toward the sheet discharge roller 135. When the medium 150 passes through the fixer 105, the toner on the surface of the medium 150 is cooled and solidified. As a result, an image is formed on the surface of the medium 150. The sheet discharge roller 135 discharges the medium 150 to a sheet discharge tray.

Since the photoreceptor 125 and the intermediate transfer belt 120 form the toner latent image on their surfaces, they can also be said to be image carriers. According to an embodiment, the image forming apparatus 100 directly transfers the toner latent image on the photoreceptor 125 to the medium 150. In this case, the medium 150 is nipped by the photoreceptor 125 and the secondary transfer roller 115.

First, the medium 150 is conveyed to the secondary transfer roller 115 by the timing roller 130. The medium 150 has the toner latent image transferred thereto by the secondary transfer roller 115. Next, the medium 150 is heated by the fixer 105. As a result, the toner on the surface of the medium 150 is melted. Consequently, an image is fixed to the medium 150. Finally, the medium 150 is discharged to the sheet discharge tray via the sheet discharge roller 135.

b. Problems Occurring Between Secondary Transfer Roller and Fixer

Next, problems that may occur between the secondary transfer roller 115 and the fixer 105 will be described. The medium 150 is conveyed while being nipped by the secondary transfer roller 115 and the fixer 105. States A, B, and C illustrate examples of a state in which the medium 150 is nipped by the secondary transfer roller 115 and the fixer 105.

In state A, the medium 150 is hardly loosened. At this time, suppose that the conveyance speed of the fixer 105 is higher than the conveyance speed of the secondary transfer roller 115. In this case, the medium 150 is stretched by the fixer 105. As a result, a printing defect such as a level difference and distortion may occur in the image to be printed on the medium 150.

In state C, the medium 150 is greatly loosened. In other words, a part of the medium 150 is greatly deviated from the assumed conveyance path. In this case, the loosened part of the medium 150 may come into contact with a rib or the like of an internal component of the image forming apparatus 100. As a result, a printing defect such as a streak may occur in the image to be printed on the medium 150.

Therefore, it is desirable that the medium 150 is slightly loosened as in state B. As the medium 150 is appropriately loosened, failure in transfer of the toner latent image can be suppressed, and contact of the medium 150 with a component such as a rib can be suppressed.

The image forming apparatus 100 adjusts the conveyance speed of the fixing roller 110 so that the medium 150 can maintain state B while the medium 150 is nipped by the secondary transfer roller 115 and the fixer 105. However, due to an individual difference or aged deterioration of the fixing roller 110, the force with which the fixer 105 nips the medium 150 changes.

For example, a case where the fixing roller 110 is new is compared with a case where the fixing roller 110 is deteriorated. The rotation speed of the fixing roller 110 in each case is the same. In this case, the conveyance speed for the medium 150 by the new fixing roller 110 is faster than the conveyance speed for the medium 150 by the deteriorated fixing roller 110. The reason for this is that the new fixing roller 110 is not abraded as compared with the deteriorated fixing roller 110 and has a stronger force for nipping the medium 150. That is, there is a problem that the conveyance speed for the medium 150 decreases when the fixing roller 110 deteriorates even though the rotation speed of the fixing roller 110 is the same.

Another problem is that the conveyance speed for the medium 150 changes due to an individual difference of the fixing roller 110. The harder the surface of the fixing roller 110, the stronger the force for nipping the medium 150 in the fixer 105. Suppose that the surface of a new fixing roller (X) is harder than the surface of the normal fixing roller 110 by a certain degree or more. Then, suppose that the fixing roller (X) is set in the image forming apparatus 100. In this case, the image forming apparatus 100 rotates the fixing roller 110 in accordance with the hardness of the normal fixing roller 110 in a new state. However, the fixing roller (X) is harder than the normal fixing roller 110. Therefore, the medium 150 is conveyed faster than expected. As a result, the medium 150 may be in state A. That is, in a case where the fixing roller 110 is too hard, the medium 150 may be conveyed faster than expected.

In order to solve the above two problems, the image forming apparatus 100 adjusts the rotation speed of the fixing roller 110 according to the state of the fixing roller 110. Actually, the image forming apparatus 100 adjusts the rotation speed of the fixing roller 110 within a certain range. For example, the image forming apparatus 100 adjusts the rotation speed of the fixing roller 110 within a range between a first speed reference value (upper limit value) and a second speed reference value (lower limit value). According to an embodiment, the image forming apparatus 100 adjusts the rotation speed of a drive motor of the fixing roller 110 within the range between the first speed reference value and the second speed reference value. Hereinbelow, the range between the first speed reference value (upper limit value) and the second speed reference value (lower limit value) may be referred to simply as a "speed range (of the fixing roller 110 or the drive motor)". The image forming apparatus 100 adjusts the rotation speed of the fixing roller 110 (drive motor) by adjusting the first speed reference value and the second speed reference value. Note that the image forming apparatus 100 may keep the difference (speed range) between the first speed reference value and the second speed reference value unchanged when changing the speed range. That is, the image forming apparatus 100 may change the upper limit value and the lower limit value while maintaining the difference between the upper limit value and the lower limit value.

c. Terms Used Herein

Next, terms for describing the technology of the present disclosure will be described.

In the present specification, an "image carrier" includes any component that carries a toner latent image. For example, the photoreceptor 125 and the intermediate transfer belt 120 are image carriers. The medium 150 to which the toner latent image is transferred can also be said to be an image carrier.

In the present specification, a "speed range (of the fixing roller 110 or the drive motor)" includes a range of the rotation speed of the fixing roller 110. Similarly, the "speed range" includes a range of the rotation speed of the drive motor of the fixing roller 110. The image forming apparatus 100 may detect the number of rotations of the fixing roller 110 by means of an encoder or the like. Furthermore, the image forming apparatus 100 may detect the number of rotations of the drive motor of the fixing roller 110 by an encoder or the like. The fixing roller 110 and the drive motor may be connected via a drive belt, a gear, or the like. In this case, the number of rotations of the fixing roller 110 may not match the number of rotations of the drive motor.

In the present specification, the "number of rotations (of the fixing roller 110 or the drive motor)" is the number of rotations of the fixing roller 110 or the number of rotations of the drive motor of the fixing roller 110. Unless otherwise specified, the number of rotations in the present specification is the number of rotations per unit time, and can be read as a rotation speed. The image forming apparatus 100 can obtain the number of rotations of the fixing roller 110 from the number of rotations of the drive motor. Therefore, the number of rotations of the fixing roller 110 may be read as the number of rotations of the drive motor.

In the present specification, a "state of the fixing roller 110" indicates a degree of deterioration of the fixing roller 110 and/or an individual difference of the fixing roller 110. The individual difference here is physical properties, hardness of the surface, and the like of the fixing roller 110. That is, the state of the fixing roller 110 includes any element that affects the force for nipping the medium 150.

In the present specification, a "state of the drive motor" indicates an element that affects the conveyance speed for the medium 150. For example, the state of the drive motor may include the number of rotations (rotation speed) of the drive motor. The state of the drive motor may include an average number of rotations of the drive motor within a certain period of time. Furthermore, the state of the drive motor may include a ratio of high-speed rotation to low-speed rotation of the drive motor per predetermined time, and the like.

In the present specification, a "state of conveyance of the medium 150" indicates at what speed the medium 150 is conveyed. That is, the state of conveyance of the medium 150 can be said to be the conveyance speed for the medium. Also, the state of conveyance of the medium 150 may include the degree of loosening (loop amount) of the medium 150.

In the present specification, a "loop amount" indicates the amount of loosening of the medium 150. For example, in states A to C, the loop amount is small, middle, and large, respectively. A sensor that detects the amount of loosening of the medium 150 can also be said to be a sensor that detects the loop amount.

B. Apparatus Configuration

Figure 2:
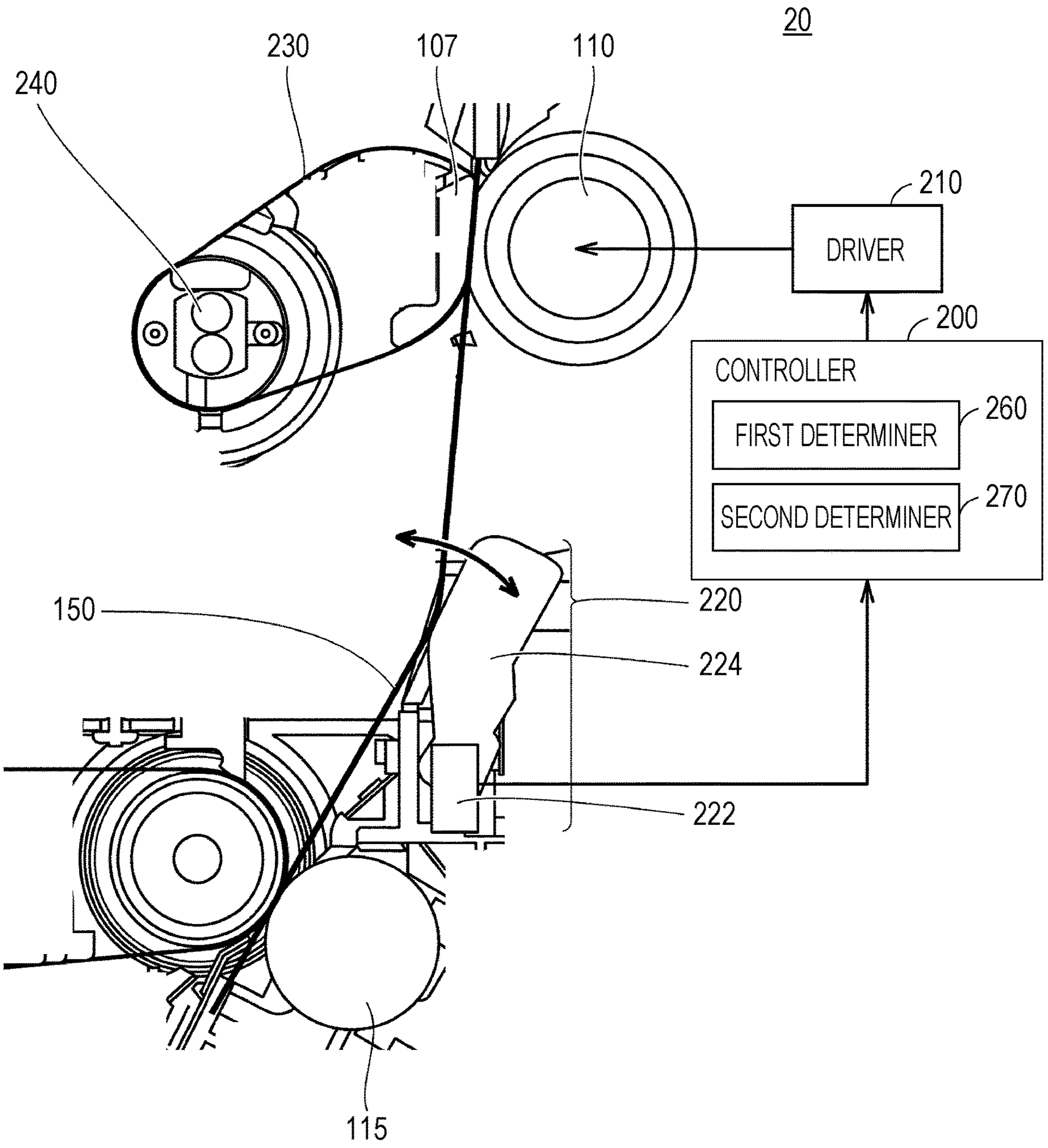
FIG. 2 is a diagram illustrating a part of a configuration of an image forming apparatus according to the present embodiment.
Figure 3:
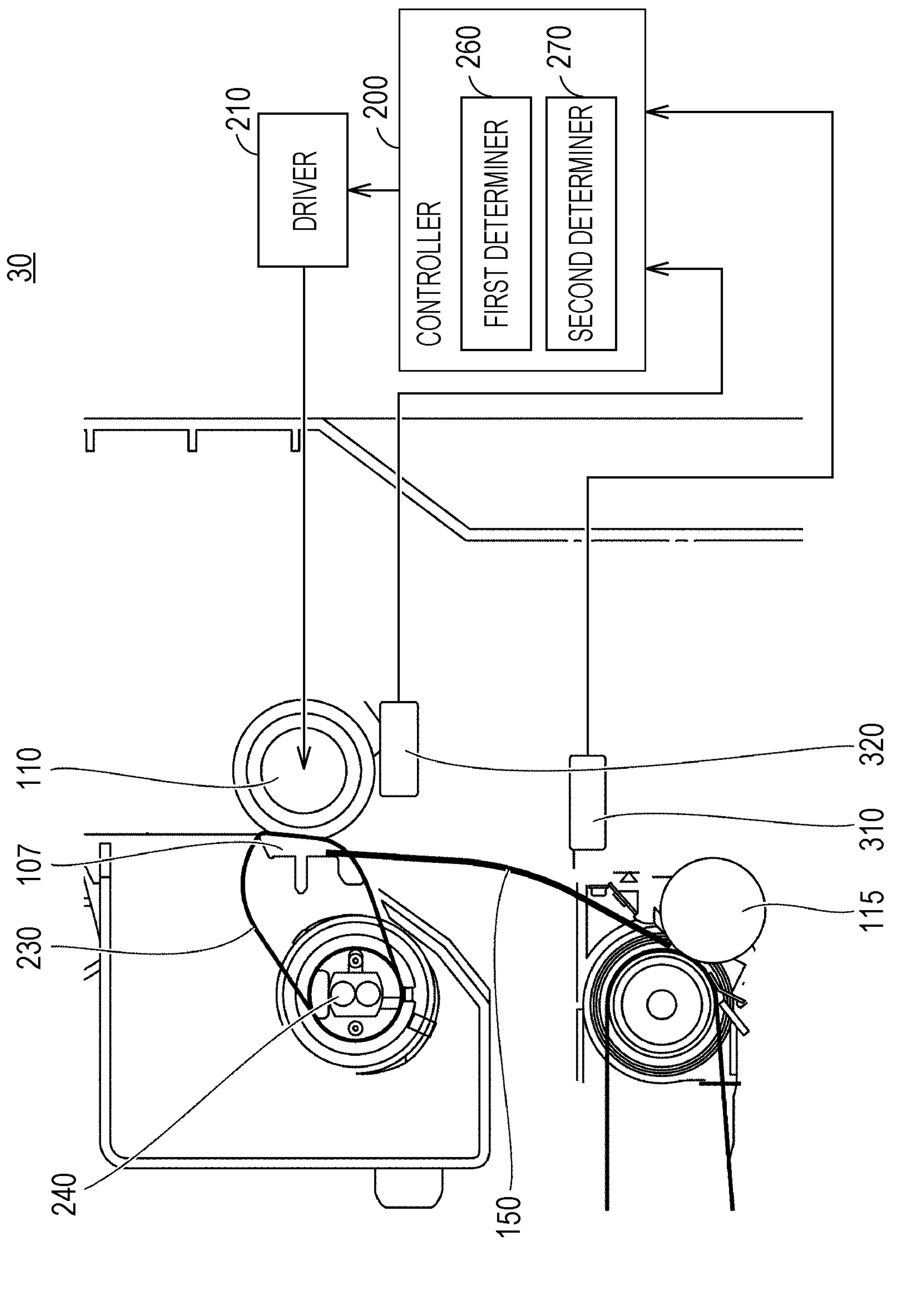
FIG. 3 is a diagram illustrating a part of a configuration of an image forming apparatus according to the present embodiment.

Next, a method for solving the problems described with reference to FIG. 1 will be described with reference to FIGS. 2 and 3. Image forming apparatuses 20 and 30 illustrated in FIGS. 2 and 3 are variations of the image forming apparatus 100. The image forming apparatus 100 includes the image forming apparatuses 20 and 30.

FIG. 2 is a diagram illustrating a part of a configuration of the image forming apparatus 20 according to the present embodiment. The image forming apparatus 20 includes a heating belt 230, a heater 240, a loop detector 220, a controller 200, and a driver 210 in addition to the components described with reference to FIG. 1. The loop detector 220 includes a photosensor 222 and an operating part 224. The controller 200 includes a first determiner 260 and a second determiner 270.

The heating belt 230 melts toner on the surface of the medium 150. The heating belt 230 is heated by the heater 240. The heating belt 230 nips the medium 150 together with the fixing roller 110 and conveys the medium 150 toward the sheet discharge roller 135. At this time, the heating belt 230 melts the toner on the surface of the medium 150.

The heater 240 heats the heating belt 230. As an example, the heater 240 is a halogen heater or the like.

The loop detector 220 detects the loop amount of the medium 150 (the amount of loosening of the medium 150) or the occurrence frequency of a loop. More specifically, suppose that the looped medium 150 touches the operating part 224. In this case, the operating part 224 is pushed by the medium 150 and falls to the right side of the drawing. As a result, the amount of light entering the photosensor 222 changes. The controller 200 acquires an output signal of the photosensor 222. The output signal of the photosensor 222 indicates the amount of light entering the photosensor 222. The controller 200 calculates the loop amount of the medium 150 or calculates the occurrence frequency of the loop from the output signal of the photosensor 222. According to an embodiment, the photosensor 222 may include a circuit that calculates the loop amount of the medium 150 from the amount of light entering the photosensor 222. In this case, the photosensor 222 outputs information indicating the loop amount of the medium 150 to the controller 200.

The controller 200 controls the rotation speed of the drive motor of the fixing roller 110 via the driver 210 on the basis of the loop amount of the medium 150 or the occurrence frequency of the loop. In addition, the controller 200 executes the first determiner 260 and the second determiner 270 as programs. Alternatively, the controller 200 may include the first determiner 260 and the second determiner 270 as circuits.

The driver 210 outputs a signal to the drive motor on the basis of a signal from the controller 200. As an example, the driver 210 is a motor driver or the like. The driver 210 outputs a pulse width modulation (PWM) signal or the like to the drive motor.

The first determiner 260 determines the state of the fixing roller 110. That is, the first determiner 260 determines the degree of deterioration and/or the individual difference of the fixing roller 110. More specifically, the first determiner 260 detects the number of rotations of the drive motor and the loop amount or the occurrence of the loop. The first determiner 260 determines the state of the fixing roller 110 on the basis of the number of rotations of the drive motor and the occurrence frequency of the loop. As an example, suppose that the number of rotations of the drive motor is an initial value, and the loop amount is small or almost no loop occurs. In this case, the first determiner 260 determines that the deterioration of the fixing roller 110 has not progressed. As another example, suppose that the number of rotations of the drive motor is an initial value, and the loop amount is large or the loop frequently occurs. In this case, the first determiner 260 determines that the deterioration of the fixing roller 110 has progressed.

The second determiner 270 determines the state of the drive motor or the state of conveyance of the medium. The state of the drive motor is, for example, the rotation speed (number of rotations per unit time) of the drive motor. The state of the drive motor may be the average rotation speed per unit time. Alternatively, the state of the drive motor may be a ratio of high-speed rotation to low-speed rotation of the drive motor per predetermined time. The second determiner 270 can determine the state of the drive motor on the basis of a command output to the driver 210. Alternatively, the second determiner 270 can determine the state of the drive motor on the basis of a signal obtained from an encoder or the like. The state of conveyance of the medium is the conveyance speed for the medium 150. The second determiner can calculate the conveyance speed for the medium 150 on the basis of a signal of each sensor illustrated in FIG. 3 or 11.

It can also be said that the first determiner 260 and the second determiner 270 are acquirers for acquiring information regarding the state of the image forming apparatus 20 or information regarding the state of the medium 150. The controller 200 causes the acquirer to acquire the information regarding the state of the image forming apparatus 20 or the information regarding the state of the medium 150. The information regarding the state of the image forming apparatus 20 is, for example, information of the fixing roller 110. The information regarding the state of the medium 150 is, for example, information regarding the conveyance speed for the medium 150. The information regarding the state of the medium 150 may include the loop amount of the medium 150. In addition, the controller 200 controls the number of rotations of the drive motor between a preset upper limit value and a preset lower limit value. Furthermore, the controller 200 changes the upper limit value and the lower limit value while maintaining the difference between the upper limit value and the lower limit value on the basis of the information acquired by the acquirer. The upper limit value and the lower limit value are the upper limit value and the lower limit value for the rotation speed of the fixing roller 110 or the drive motor thereof.

More specifically, the controller 200 adjusts the range of the rotation speed (the number of rotations) of the fixing roller 110 or the drive motor thereof on the basis of the determination results of the first determiner 260 and the second determiner 270. The controller 200 controls the number of rotations of the drive motor within a preset range on the basis of the state of the fixing roller determined by the first determiner. Then, the controller 200 changes the range on the basis of the state of the drive motor or the conveyance speed for the medium determined by the second determiner. The first determiner 260 determines the state of the fixing roller 110 on the basis of the loop amount or the occurrence frequency of the loop.

Thus, the image forming apparatus 20 can continue printing processing while maintaining the medium 150 in an appropriately loosened state. As an example, suppose that the fixing roller 110 deteriorates and the force for nipping the medium 150 becomes weak. In this case, the image forming apparatus 20 conveys the medium 150 at higher speed by setting the range of the number of rotations of the drive motor to be high. As a result, the occurrence frequency of the loop of the medium 150 decreases. Alternatively, the loop amount of the medium 150 becomes small.

As another example, suppose that the surface of the fixing roller 110 is hard and the force for nipping the medium 150 is too strong. That is, suppose that the medium 150 is in state A in FIG. 1. In this case, the image forming apparatus 20 conveys the medium 150 at lower speed by setting the range of the number of rotations of the drive motor to be low. As a result, the medium 150 is looped (loosened) moderately.

FIG. 3 is a diagram illustrating a part of a configuration of the image forming apparatus 30 according to the present embodiment. Unlike the image forming apparatus 20, the image forming apparatus 30 includes a first detector 310 and a second detector 320 instead of the loop detector 220.

The first detector 310 is provided between the secondary transfer roller 115 and the fixing roller 110. The first detector 310 is disposed upstream of the second detector 320 on the conveyance path for the medium 150, and detects passage of the medium 150. As an example, the first detector 310 detects that the front end of the medium 150 has reached in front of the first detector 310. As another example, the first detector 310 detects that the rear end of the medium 150 has passed a position in front of the first detector 310.

The second detector 320 is provided between the secondary transfer roller 115 and the fixing roller 110. The second detector 320 is disposed downstream of the first detector 310 on the conveyance path for the medium 150, and detects passage of the medium 150. As an example, the second detector 320 detects that the leading end of the medium 150 has reached in front of the second detector 320. As another example, the second detector 320 detects that the rear end of the medium 150 has passed a position in front of the second detector 320.

The controller 200 acquires a signal from the first detector 310 and a signal from the second detector 320. The controller 200 calculates a difference between a time when the signal is acquired from the first detector 310 and a time when the signal is acquired from the second detector 320. The controller 200 calculates the loop amount or the occurrence frequency of the loop of the medium 150 on the basis of the difference. The controller 200 calculates the conveyance state (conveyance speed) for the medium 150 on the basis of the difference. More specifically, the first determiner 260 determines the state (the degree of deterioration, the individual difference, and the like) of the fixing roller 110 on the basis of the difference between a time when the first detector 310 has detected and a time when the second detector 320 has detected. For example, the first detector 310 can estimate the strength of the nip of the fixing roller 110 from the rotation speed of the drive motor and the conveyance speed for the medium 150. Then, the first detector 310 can determine the state of the fixing roller 110 from the strength of the nip.

The second determiner 270 determines the state of conveyance of the medium 150 on the basis of the difference between the time when the first detector 310 has detected and the time when the second detector 320 has detected. The state of conveyance of the medium 150 is, for example, the conveyance speed, whether or not the loop is generated, and the like. In this manner, the image forming apparatus 30 can appropriately adjust the range of the number of rotations of the drive motor similarly to the image forming apparatus 20.

According to an embodiment, the image forming apparatus 30 may include the loop detector 220. In this case, the image forming apparatus 30 determines the state of the fixing roller 110 on the basis of the difference between the detection times when the first detector and the second detector have detected and the loop amount.

Alternatively, the image forming apparatus 30 determines the state of the fixing roller 110 on the basis of the difference between the detection times when the first detector and the second detector have detected and the occurrence frequency of the loop.

C. Control Procedure for Number of Rotations of Fixing Roller

Next, factors that affect the conveyance speed for the medium 150 will be described with reference to FIGS. 4 to 9. In addition, items related to the control procedure for the number of rotations of the fixing roller 110 or the drive motor thereof will be described.

FIG. 4 is a diagram illustrating examples of factors that affect the conveyance speed for the medium. A table 400 illustrates examples of factors that affect the conveyance speed for the medium 150. The factors include an outer shape and hardness of the fixing roller 110. The factors also include a nip width. The nip width affects the load applied to the medium 150. The factors further include sliding resistance. The sliding resistance varies depending on a sliding sheet, grease, and friction powder. The sliding sheet is attached to, for example, the surface of the pad 107. The grease is applied to the surface of the pad 107 or the surface of the sliding sheet. The friction powder is generated, for example, as the heating belt 230 and the pad 107 are in friction against each other. These factors vary for each fixer 105. In addition, the factors other than the nip width affect the conveyance speed more due to deterioration as the image forming apparatus 100 operates. Graphs 410 and 420 each illustrate the relationship between the rotation speed of the fixing roller 110 and the conveyance speed for the medium 150. The graph 410 illustrates the conveyance speed for the medium in a case where the fixer 105 or the fixing roller 110 is new. The graph 420 illustrates the conveyance speed for the medium in a case where the fixer 105 or the fixing roller 110 deteriorates. As is apparent from the graph 410 and the graph 420, the conveyance speed for the medium 150 is lowered at the same number of rotations of the fixing roller 110 due to the deterioration of the fixer 105.

Figure 5:
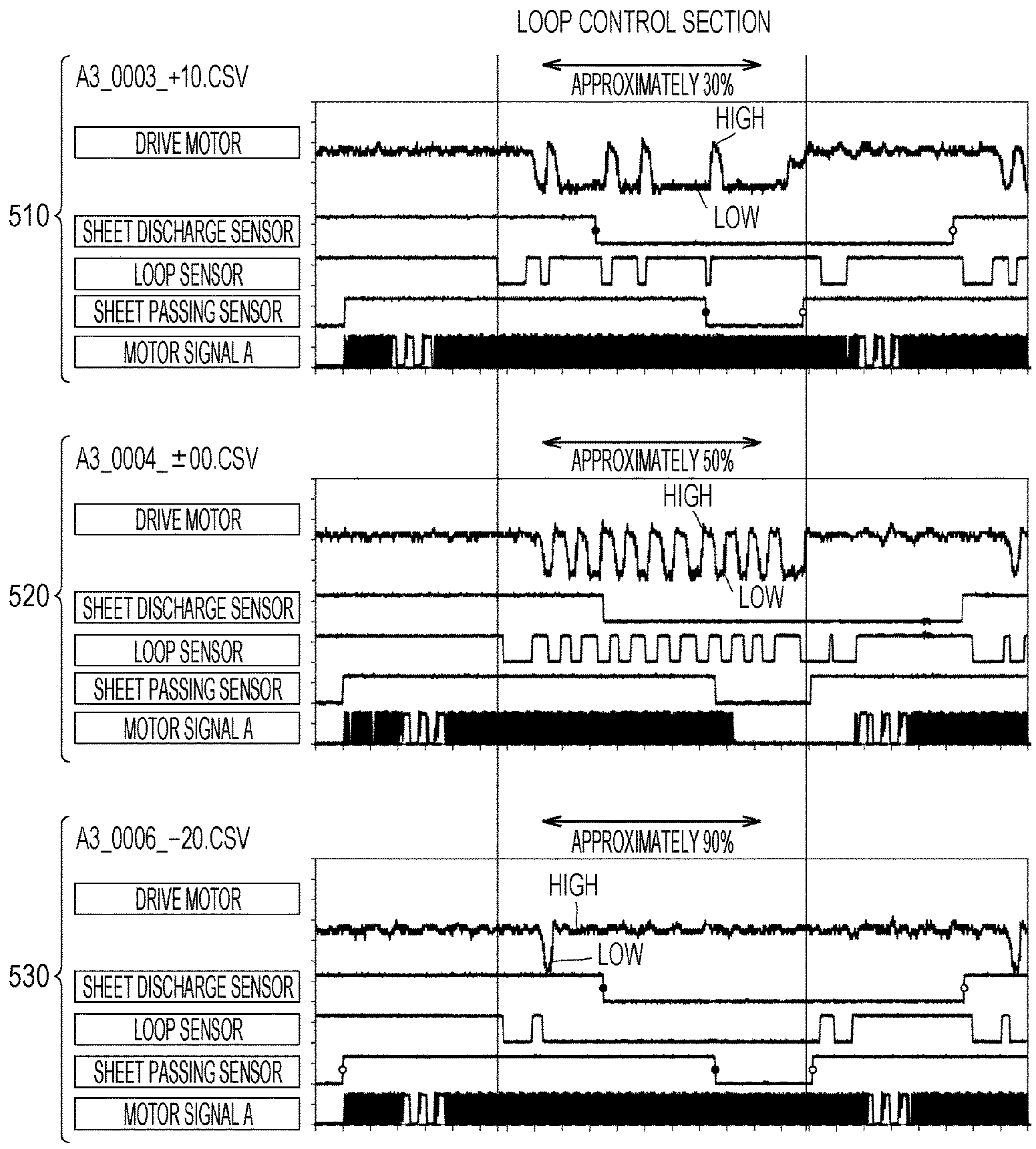
FIG. 5 is a diagram illustrating an example of output signals of respective sensors and a motor driver for each state of a fixing roller.

FIG. 5 is a diagram illustrating an example of output signals of the respective sensors and the motor driver for each state of the fixing roller. The waveforms of an oscilloscope in states 510, 520, and 530 are illustrated. The waveforms of the oscilloscope include a signal of the drive motor of the fixing roller 110, a signal of a sheet discharge sensor, a signal of a sheet passing sensor, and a motor signal A (a signal of a drive motor of the timing roller). Loop control is processing in FIGS. 2 and 3. A loop control section is a section in which the processing in FIGS. 2 and 3 is performed.

The state 510 indicates a state in which the fixing roller 110 is new. A loop sensor (loop detector 220) hardly detects the occurrence of the loop. The ratio at which the signal of the drive motor is LOW is higher than the ratio at which it is HIGH. This indicates that the image forming apparatus 100 rotates the drive motor at relatively low speed. This also indicates that the image forming apparatus 100 can convey the medium 150 without greatly looping the medium 150.

The state 520 indicates a state in which the deterioration of the fixing roller 110 has progressed to some extent. The loop sensor (loop detector 220) detects the occurrence of the loop more frequently than in the case of the state 510. The ratio at which the signal of the drive motor is HIGH and the ratio at which it is LOW are substantially the same. This indicates that the image forming apparatus 100 rotates the drive motor at relatively high speed. This also indicates that the loop of the medium 150 occurs to some extent.

The state 530 indicates a state in which the deterioration of the fixing roller 110 has greatly progressed. The loop sensor (loop detector 220) detects the occurrence of the loop in the most part of the section as compared with the cases of the states 510 and 520. The signal of the drive motor is mostly HIGH. This indicates that the image forming apparatus 100 rotates the drive motor at extremely high speed. This also indicates that the loop of the medium 150 occurs frequently.

The image forming apparatus 100 can determine the state of the fixing roller 110 and the conveyance state for the medium 150 by referring to the loop detector 220, the number of rotations of the drive motor, and the like. In addition, the image forming apparatus 100 can adjust the rotation speed of the fixing roller 110 on the basis of the determination results of these states.

Figure 6:
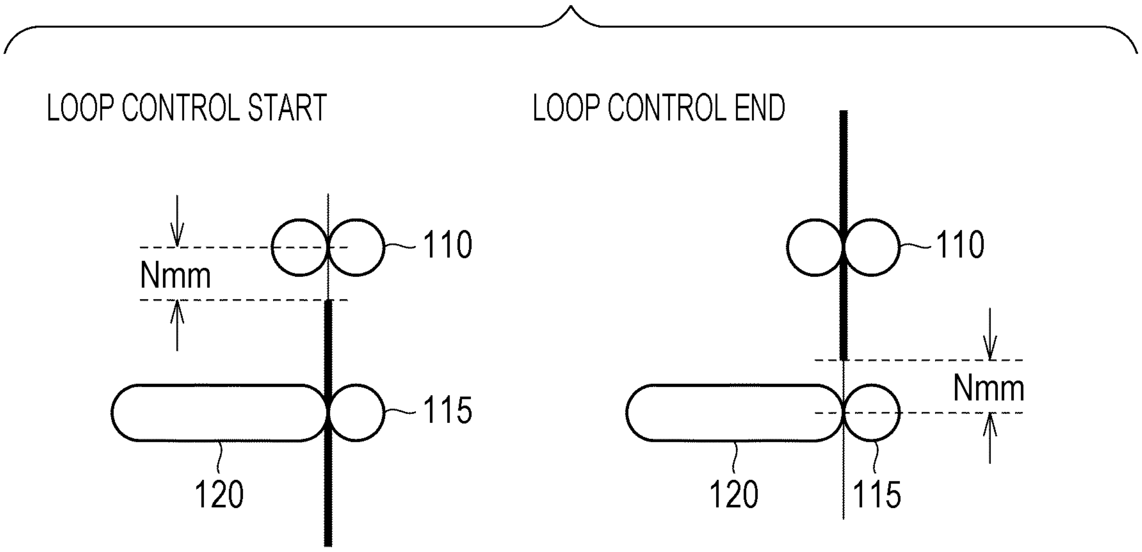
FIG. 6 is a diagram illustrating an example of a section in which a controller performs loop control.

FIG. 6 is a diagram illustrating an example of a section in which the controller 200 performs the loop control. As an example, the image forming apparatus 100 starts the loop control on the basis of the fact that the front end of the medium 150 has reached N mm (N is a freely-selected numerical value) before the fixing roller 110. As an example, the image forming apparatus 100 ends the loop control on the basis of the fact that the rear end of the medium 150 has passed the secondary transfer roller 115 by N mm (N is a freely-selected numerical value). N mm is, for example, 5 mm. A high speed ratio of the drive motor is calculated as "time when signal of drive motor is HIGH/loop control time". As an example, the high speed ratio of the drive motor is used to calculate the average number of rotations of the drive motor. As an example, the high speed ratio of the drive motor is used to calculate the ratio of high-speed rotation to low-speed rotation of the drive motor per predetermined time.

Figure 7:
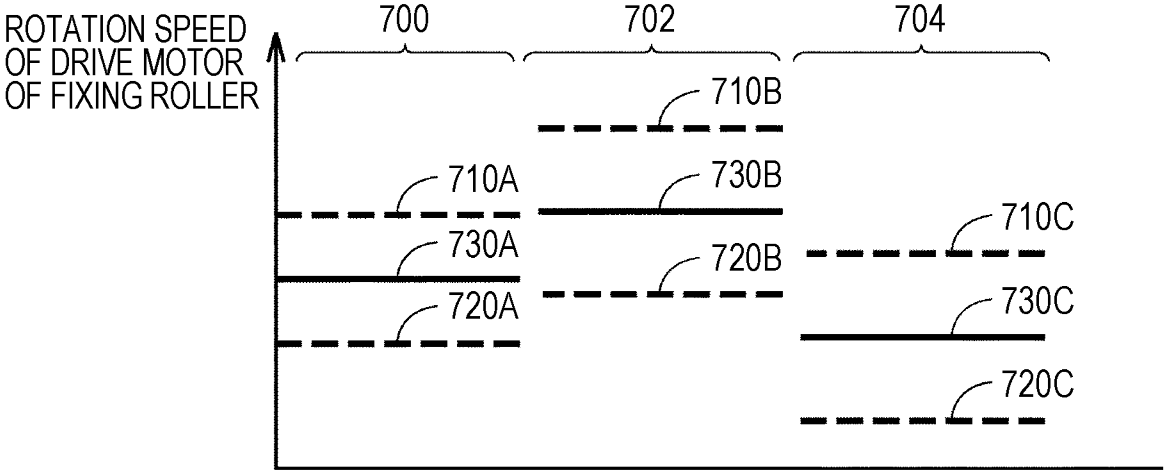
FIG. 7 is a diagram illustrating an example of adjustment of the speed range of a drive motor of the fixing roller performed by the controller.

FIG. 7 is a diagram illustrating an example of adjustment of the speed range of the drive motor of the fixing roller 110 performed by the controller 200. As described with reference to FIGS. 2 and 3, the image forming apparatus 100 adjusts the range of the number of rotations of the drive motor of the fixing roller 110 according to the state of the fixing roller 110. A procedure for adjusting the range of the number of rotations of the drive motor will be described with reference to FIG. 7.

A state 700 indicates that the fixing roller 110 is new. The controller 200 makes adjustment so that a rotation speed 730A of the drive motor is a first speed reference value 710A or less and a second speed reference value 720A or more.

A state 702 indicates that the fixing roller 110 has deteriorated or the nip force of the fixing roller 110 is low. The controller 200 makes adjustment so that a rotation speed 730B of the drive motor is a first speed reference value 710B or less and a second speed reference value 720B or more. The first speed reference value 710B is higher than the first speed reference value 710A. The second speed reference value 720B is higher than the second speed reference value 720A. As a result, the average value for the rotation speed 730B of the drive motor is higher than the average value for the rotation speed 730A of the drive motor. That is, in a case where the fixing roller 110 has deteriorated or the nip force of the fixing roller 110 is low, the image forming apparatus 100 sets the range of the speed of the drive motor to be high. By doing so, the image forming apparatus 100 suppresses the occurrence of the loop of the medium 150.

A state 704 indicates that the fixing roller 110 is too hard due to the individual difference. The controller 200 makes adjustment so that a rotation speed 730C of the drive motor is a first speed reference value 710C or less and a second speed reference value 720C or more. The first speed reference value 710C is lower than the first speed reference value 710A. The second speed reference value 720C is lower than the second speed reference value 720A. As a result, the average value for the rotation speed 730C of the drive motor is lower than the average value for the rotation speed 730A of the drive motor. That is, in a case where the fixing roller 110 is too hard or the nip force of the fixing roller 110 is too high, the image forming apparatus 100 sets the range of the speed of the drive motor to be low. By doing so, the image forming apparatus 100 inhibits the medium 150 from being stretched in the loop control section, and appropriately loops the medium 150.

According to an embodiment, the image forming apparatus 100 may keep the difference (speed range) between the first speed reference value and the second speed reference value unchanged when changing the speed range. That is, the image forming apparatus 100 may change the upper limit value and the lower limit value for the speed while maintaining the difference between the upper limit value and the lower limit value for the speed. In this case, the difference between the first speed reference value 710A and the second speed reference value 720A is equal to the difference between the first speed reference value 710B and the second speed reference value 720B. Also, the difference between the first speed reference value 710A and the second speed reference value 720A is equal to the difference between the first speed reference value 710C and the second speed reference value 720C.

Figure 8:
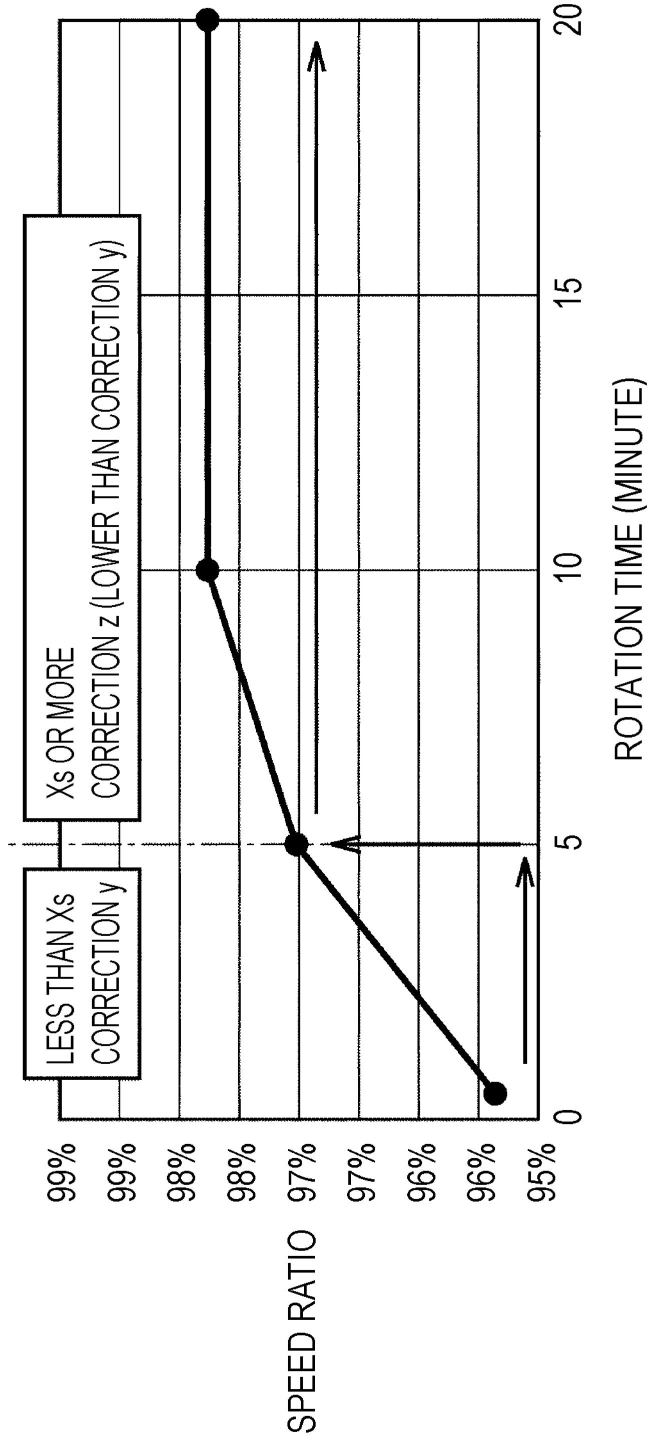
FIG. 8 is a graph illustrating an example of the relationship between an operating time and a correction value for the conveyance speed for the medium.

FIG. 8 is a graph illustrating an example of the relationship between an operating time and a correction value for the conveyance speed for the medium. When the image forming apparatus 100 operates for a certain period of time or more, the temperature of the fixer 105 increases. When the temperature of the fixer 105 increases, the temperature of the surface and the metal core of the fixing roller 110 increases. As a result, the fixing roller 110 expands. When the fixing roller 110 expands, the nip force of the fixer 105 is improved. Therefore, the image forming apparatus 100 changes the correction value for the medium speed according to the temperature of the fixing roller 110 or the length of the rotation time.

As an example, the image forming apparatus 100 multiplies a set value for the speed range of the drive motor of the fixing roller 110 by a correction value. By doing so, the image forming apparatus 100 adjusts the rotation speed of the fixing roller 110. The image forming apparatus 100 uses different speed correction values for a certain period of time from the operation of the image forming apparatus 100 and for a period thereafter. By doing so, the image forming apparatus 100 changes the rotation speed of the fixing roller 110 at a time between the certain period of time from the operation of the image forming apparatus 100 and the period thereafter.

For the certain period of time from the operation of the image forming apparatus 100, the fixing roller 110 is not expanded by heat. Therefore, a correction value y used immediately after the operation of the image forming apparatus 100 (for less than X seconds from the start of the operation) is higher than a correction value z used thereafter (after X seconds have passed from the start of the operation). According to an embodiment, the image forming apparatus 100 use different correction values for less than X seconds (freely-selected time) from the start of the operation of the image forming apparatus 100 and for a period thereafter.

Figure 9:
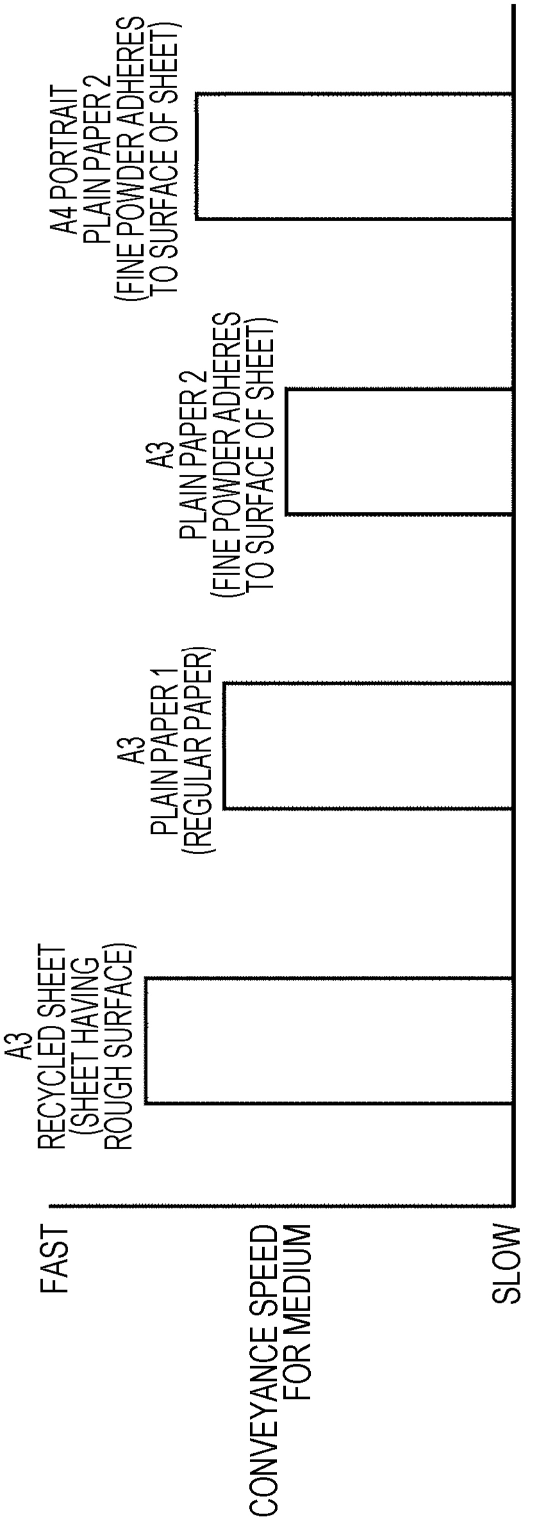
FIG. 9 is a diagram illustrating an example of differences in the conveyance speed among mediums.

FIG. 9 is a diagram illustrating an example of differences in the conveyance speed among mediums. The conveyance speed for the medium 150 differs for each type of medium 150. For example, the conveyance speed for a sheet having a rough surface such as a recycled sheet is high. Also, when fine powder adheres to the surface of the medium 150, the frictional resistance between the medium 150 and the fixing roller 110 decreases. Therefore, the conveyance speed for the medium 150 with the fine powder adhering to the surface decreases. In addition, the conveyance speed for the medium 150 having a narrow width is relatively high. The reason for this is that, when the medium 150 having a narrow width is conveyed by the fixing roller 110, the contact area with the fixing roller 110 and the heating belt 230 increases. In this manner, in a case where the type of the medium 150 changes, the conveyance speed for the medium 150 by the fixing roller 110 also changes.

Therefore, in the image forming apparatus 100 it is preferable to adjust the conveyance speed for the medium 150 according to the type of the medium. The image forming apparatus 100 adjusts the conveyance speed for the medium 150 by adjusting the rotation speed of the fixing roller 110 or the drive motor. In addition to the components illustrated in FIG. 1, the image forming apparatus 100 includes components for adjusting the conveyance speed for the medium 150 according to the type of the medium. The image forming apparatus 100 includes a medium detector (third detector) (not illustrated) for detecting the type of the medium 150, a temperature sensor (not illustrated), and a humidity sensor (not illustrated). The image forming apparatus 100 further includes a third determiner (not illustrated) that determines the type of the medium 150 on the basis of the detection result of the medium detector (third detector).

The medium detector is provided along the conveyance path for the medium 150. The temperature sensor and the humidity sensor are provided at freely-selected positions inside the image forming apparatus 100. The controller 200 acquires a signal from the medium detector. Then, the controller 200 determines the type of the medium 150 on the basis of the signal. The controller 200 adjusts the rotation speed of the fixing roller 110 or the drive motor on the basis of the type of the medium 150. Alternatively, the controller 200 adjusts the range of the rotation speed of the fixing roller 110 or the drive motor on the basis of the type of the medium 150 to be conveyed. Furthermore, the controller 200 can adjust a change amount of the range of the rotation speed of the drive motor described in FIGS. 2 and 3 on the basis of the type of the medium 150 to be conveyed.

According to an embodiment, the controller 200 acquires signals from the temperature sensor and the humidity sensor. Then, the controller 200 determines the temperature and humidity inside the image forming apparatus 100 on the basis of the signals. The controller 200 adjusts the rotation speed of the fixing roller 110 or the drive motor on the basis of the temperature and the humidity. Alternatively, the controller 200 adjusts the range of the rotation speed of the fixing roller 110 or the drive motor on the basis of the temperature and the humidity. Furthermore, the controller 200 can adjust the change amount of the range of the rotation speed of the drive motor described in FIGS. 2 and 3 on the basis of the temperature and the humidity.

According to another embodiment, the controller 200 acquires signals from the medium detector, the temperature sensor, and the humidity sensor. The controller 200 determines the type of the medium 150, and the temperature and humidity inside the image forming apparatus 100 on the basis of the signals. Then, the controller 200 adjusts the rotation speed of the fixing roller 110 or the drive motor on the basis of the type of the medium 150, the temperature, and the humidity. Alternatively, the controller 200 adjusts the range of the rotation speed of the fixing roller 110 or the drive motor on the basis of the type of the medium 150, the temperature, and the humidity. Furthermore, the controller 200 can adjust the change amount of the range of the rotation speed of the drive motor described in FIGS. 2 and 3 on the basis of the type of the medium 150, the temperature, and the humidity.

Figure 10:
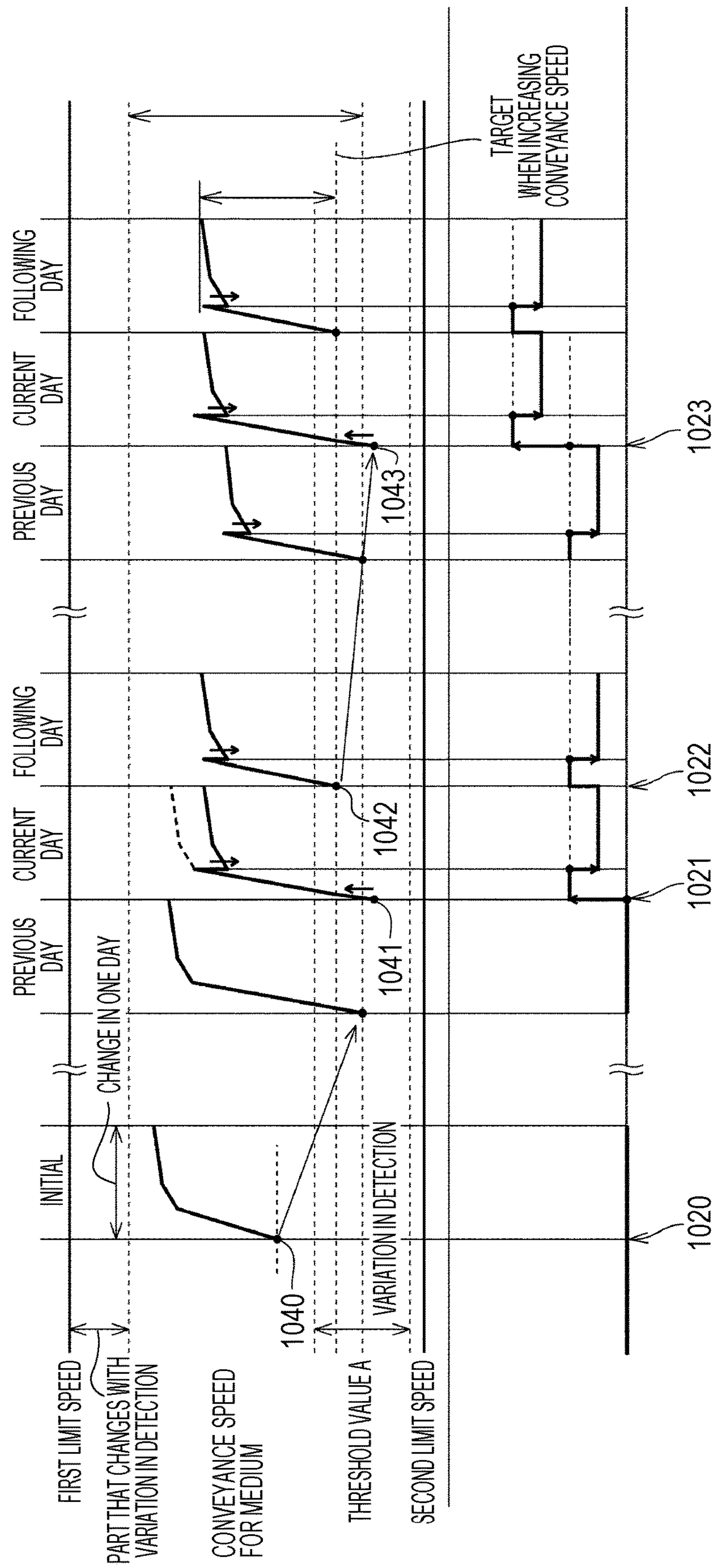
FIG. 10 is a time-series diagram illustrating an example of processing of adjusting the speed range of the drive motor.

FIG. 10 is a time-series diagram illustrating an example of processing of adjusting the speed range of the drive motor. With reference to FIG. 10, times when the image forming apparatus 100 executes the processing described with reference to FIGS. 2 and 3 will be described.

A threshold value A is a threshold value for the conveyance speed for the medium 150. The image forming apparatus 100 calculates the conveyance speed for the medium 150 on the basis of signals or the like of the sensors illustrated in FIG. 2 or 11. The image forming apparatus 100 determines whether or not the conveyance speed for the medium 150 is lower than the threshold value A. The image forming apparatus 100 executes the determination immediately after activation or within a certain period of time after activation. In a case where the conveyance speed for the medium 150 is lower than the threshold value A, the image forming apparatus 100 sets the range of the rotation speed of the fixing roller 110 or the drive motor thereof to be high.

Referring to FIG. 10 as an example, at a time 1020, the image forming apparatus 100 is activated and determines whether or not a conveyance speed 1040 for the medium 150 is lower than the threshold value A. At the time 1020, the conveyance speed 1040 for the medium 150 is not lower than the threshold value A. Therefore, the image forming apparatus 100 does not change the range of the rotation speed of the fixing roller 110 or the drive motor thereof.

At a time 1021, the image forming apparatus 100 is activated and determines whether or not a conveyance speed 1041 for the medium 150 is lower than the threshold value A. At the time 1021, the conveyance speed 1041 for the medium 150 is lower than the threshold value A. Therefore, the image forming apparatus 100 sets the range of the rotation speed of the fixing roller 110 or the drive motor thereof to be high.

At a time 1022, the image forming apparatus 100 is activated and determines whether or not a conveyance speed 1042 for the medium 150 is lower than the threshold value A. At the time 1022, the conveyance speed 1042 for the medium 150 is not lower than the threshold value A. Therefore, the image forming apparatus 100 does not change the range of the rotation speed of the fixing roller 110 or the drive motor thereof.

At a time 1023, the image forming apparatus 100 is activated and determines whether or not a conveyance speed 1043 for the medium 150 is lower than the threshold value A. At the time 1023, the conveyance speed 1043 for the medium 150 is lower than the threshold value A. Therefore, the image forming apparatus 100 sets the range of the rotation speed of the fixing roller 110 or the drive motor thereof to be high.

In this manner, in the image forming apparatus 100, every time the conveyance speed for the medium 150 decreases, the image forming apparatus 100 sets the range of the rotation speed of the fixing roller 110 or the drive motor thereof to be high. According to an embodiment, the image forming apparatus 100 determines whether or not a detection frequency of the loop of the medium 150 exceeds a predetermined threshold value. Then, based on the fact that the detection frequency of the loop of the medium 150 exceeds the threshold value, the image forming apparatus 100 sets the range of the rotation speed of the fixing roller 110 or the drive motor thereof to be high.

FIG. 11 is a diagram illustrating sensors included in the image forming apparatus according to the present embodiment and examples of actual measurement values for periods for the medium to arrive at respective passing points. The image forming apparatus 100 includes various sensors such as a timing sensor, the loop sensor (loop detector 220), and the sheet discharge sensor. The image forming apparatus 100 calculates periods for the medium 150 to passes through sections A, B, and C on the basis of the signals from these sensors. According to an embodiment, the conveyance speed for the medium 150 in the loop control section may be calculated on the basis of the signals from the respective sensors.

D. Flowchart

Figure 12:
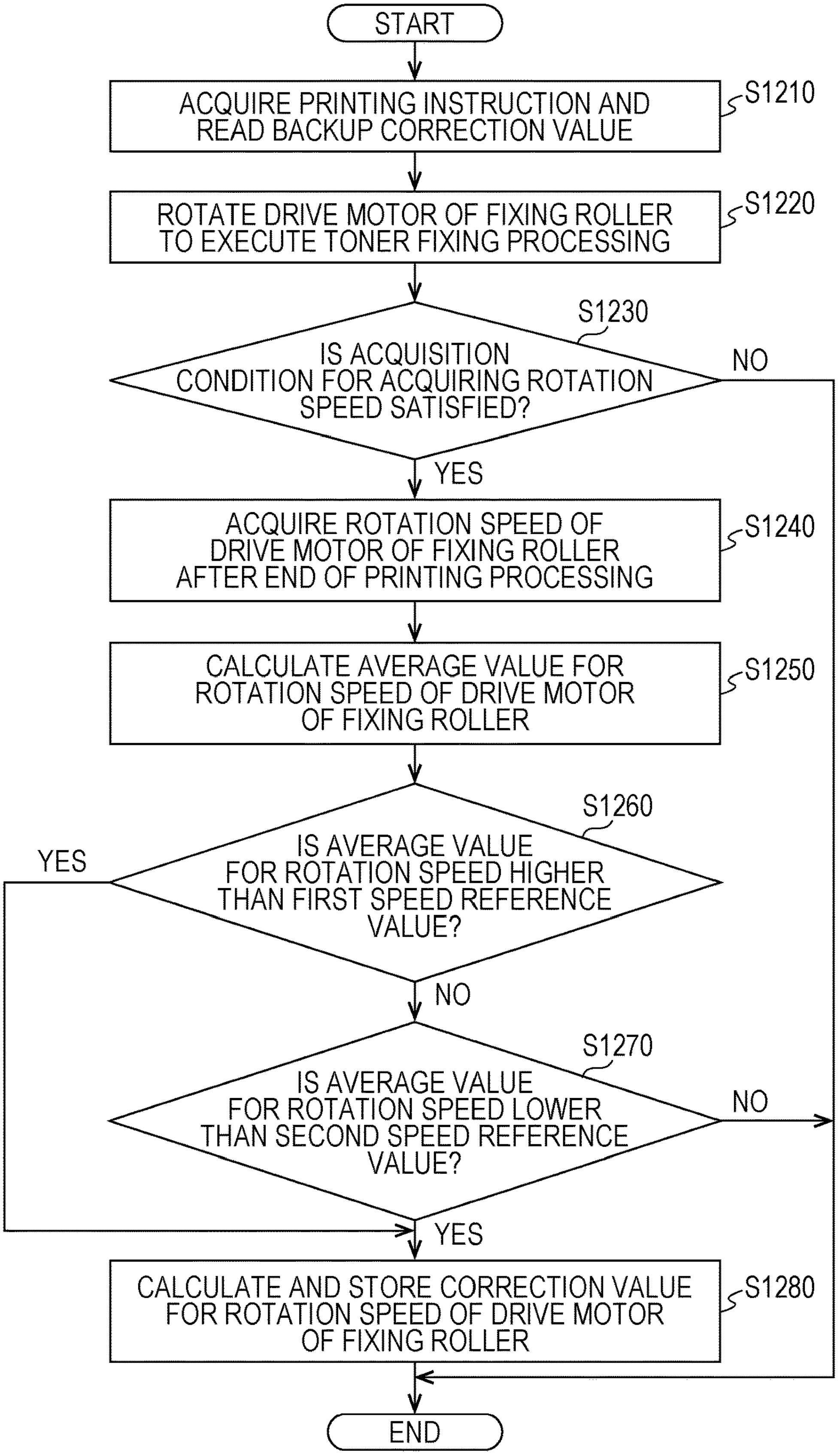
FIG. 12 is a flowchart illustrating an example of processing inside the image forming apparatus according to the present embodiment.

FIG. 12 is a flowchart illustrating an example of processing inside the image forming apparatus according to the present embodiment. According to an embodiment, the controller 200 executes a program for performing the processing in FIG. 12. In this case, the controller 200 reads the program from a storage (not illustrated) to a memory (not illustrated). In another aspect, part or all of the processing may also be achieved as a combination of circuit elements configured to perform the processing.

In step S1210, the controller 200 acquires a printing instruction and reads a backup correction value. The controller 200 acquires the printing instruction via a network or from an operation panel (not illustrated). In addition, the controller 200 reads the backup correction value from the storage to the memory. The backup correction value is a correction value for correcting the speed setting of the drive motor. Alternatively, the backup correction value may be a set value for the speed range of the drive motor or a correction value for the set value for the speed range of the drive motor.

In step S1220, the controller 200 rotates the drive motor of the fixing roller 110 to execute toner fixing processing.

In step S1230, the controller 200 determines whether or not an acquisition condition for acquiring the rotation speed of the fixing roller 110 is satisfied. As an example, the acquisition condition may be one in which the current time is within a certain period of time after the activation of the image forming apparatus 100. In a case of determining that the acquisition condition for acquiring the rotation speed of the fixing roller 110 is satisfied (YES in step S1230), the controller 200 shifts the control to step S1240. Otherwise (NO in step S1230), the controller 200 ends the processing.

In step S1240, the controller 200 acquires the rotation speed of the fixing roller 110 after the end of the printing processing. According to an embodiment, the controller 200 acquires a signal related to the rotation speed of the fixing roller 110 from an encoder provided on the rotation shaft of the fixing roller 110. Alternatively, the controller 200 acquires a signal related to the rotation speed of the fixing roller 110 from an encoder provided on the rotation shaft of the drive motor of the fixing roller 110.

In step S1250, the controller 200 calculates an average value for the rotation speed of the drive motor of the fixing roller 110. The average value is an average value for the rotation speed of the drive motor of the fixing roller 110 per predetermined time. According to an embodiment, the controller 200 may calculate a ratio of high-speed rotation to low-speed rotation of the drive motor of the fixing roller 110 per predetermined time.

In step S1260, the controller 200 determines whether or not the average value for the rotation speed is higher than a first speed reference value 710. In a case of determining that the average value for the rotation speed is higher than the first speed reference value 710 (YES in step S1260), the controller 200 shifts the control to step S1280. Otherwise (NO in step S1260), the controller 200 shifts the control to step S1270. According to an embodiment, the controller 200 may determine whether or not the ratio of the high-speed rotation to the low-speed rotation is higher than the first speed reference value 710. In this case, the first speed reference value 710 is a reference value for the ratio.

In step S1270, the controller 200 determines whether or not the average value for the rotation speed is lower than a second speed reference value 720. In a case of determining that the average value for the rotation speed is lower than the second speed reference value 720 (YES in step S1270), the controller 200 shifts the control to step S1280. Otherwise (NO in step S1270), the controller 200 ends the processing. According to an embodiment, the controller 200 may determine whether or not the ratio of the high-speed rotation to the low-speed rotation is lower than the second speed reference value 720. In this case, the second speed reference value 720 is a reference value for the ratio.

In step S1280, the controller 200 calculates and stores the correction value for the rotation speed of the drive motor of the fixing roller 110. The image forming apparatus 100 uses the newly stored correction value in subsequent control of the drive motor. As a result, the image forming apparatus 100 can change the speed range of the drive motor in subsequent control.

As described above, the image forming apparatus 100 according to the present embodiment controls the number of rotations of the drive motor within a preset range on the basis of the state of the fixing roller 110. Then, the image forming apparatus 100 changes the range on the basis of the state of the drive motor or the conveyance state for the medium. Thus, the image forming apparatus 100 can continue printing processing while maintaining the medium 150 in an appropriately loosened state.

According to an embodiment, it is possible to adjust the number of rotations of a drive motor of a fixing roller on the basis of an individual difference or a deterioration state of the fixing roller.

Although embodiments of the present invention have been described and illustrated in detail, the disclosed embodiments are made for purposes of illustration and example only and not limitation. The scope of the present invention should be interpreted by terms of the appended claims, and it is intended that all modifications are included within the meaning and scope equivalent to the patent claims. In addition, it is intended that the disclosed contents described in the embodiment and the respective modification examples are carried out alone or in combination as much as possible.

What is claimed is:

1. An image forming apparatus comprising:

a fixing roller that fixes an unfixed image to a medium;

a drive motor of the fixing roller; and a hardware processor that acquires information regarding a state of the image forming apparatus or information regarding a state of the medium, and controls a number of rotations of the drive motor between a preset upper limit value and a preset lower limit value, wherein the hardware processor changes the upper limit value and the lower limit value while maintaining a difference between the upper limit value and the lower limit value on a basis of the acquired information.

2. The image forming apparatus according to claim 1, wherein the information regarding the state of the image forming apparatus is information regarding the fixing roller, the information regarding the state of the medium is information regarding a conveyance speed for the medium, the hardware processor determines a state of the fixing roller, and determines a state of the drive motor or the conveyance speed for the medium, controlling the number of rotations of the drive motor between the preset upper limit value and the preset lower limit value includes controlling the number of rotations of the drive motor in a range preset by the upper limit value and the lower limit value on a basis of the state of the fixing roller determined by the hardware processor, and changing the upper limit value and the lower limit value while maintaining the difference between the upper limit value and the lower limit value includes changing the range on a basis of the state of the drive motor or the conveyance speed for the medium determined by the hardware processor.

3. The image forming apparatus according to claim 2, further comprising:

a transferer that transfers the unfixed image on an image carrier to the medium; and a loop detector that detects a loop amount or an occurrence frequency of a loop of the medium between the transferer and the fixing roller, wherein the hardware processor determines the state of the fixing roller on a basis of the loop amount or the occurrence frequency of the loop.

4. The image forming apparatus according to claim 2, further comprising:

a first detector that is installed on a conveyance path for the medium and detects that the medium has passed; and a second detector that is installed further on a downstream side than the first detector on the conveyance path for the medium and detects that the medium has passed, wherein the hardware processor determines the state of the fixing roller on a basis of a difference between a time when the first detector has detected and a time when the second detector has detected.

5. The image forming apparatus according to claim 4, wherein the hardware processor determines the conveyance speed for the medium on a basis of the difference between the time when the first detector has detected and the time when the second detector has detected.

6. The image forming apparatus according to claim 4, further comprising:

a transferer that transfers the unfixed image on an image carrier to the medium; and a loop detector that detects a loop amount or an occurrence frequency of a loop of the medium between the transferer and the fixing roller, wherein determining the state of the fixing roller includes that the hardware processor determines the state of the fixing roller on a basis of the difference between the time when the first detector has detected and the time when the second detector has detected and the loop amount or the occurrence frequency of the loop.

7. The image forming apparatus according to claim 1, wherein the state of the drive motor is an average number of rotations of the drive motor.

8. The image forming apparatus according to claim 1, wherein the state of the drive motor is a ratio of high-speed rotation to low-speed rotation of the drive motor per predetermined time.

9. The image forming apparatus according to claim 1, wherein the hardware processor adjusts a change amount of a range of the number of rotations of the drive motor according to a type of the medium to be conveyed.

10. The image forming apparatus according to claim 9, further comprising:

a third detector that detects a physical property of the medium; and a third determiner that determines the type of the medium on a basis of a detection result of the third detector.

11. The image forming apparatus according to claim 1, wherein at least a part of the fixing roller is a silicone sponge.

* * * * *